United States Patent

Makino et al.

[11] Patent Number: 5,841,276
[45] Date of Patent: Nov. 24, 1998

[54] MAGNETIC GEAR ROTATION SENSOR

[75] Inventors: Yasuaki Makino, Okazaki; Seiki Aoyama, Toyohashi; Toshikazu Arasuna, Toyota, all of Japan

[73] Assignee: Nippondenso Co., Ltd, Kariya, Japan

[21] Appl. No.: 645,261

[22] Filed: May 13, 1996

[30] Foreign Application Priority Data

May 12, 1995 [JP] Japan ................................ 7-114786

[51] Int. Cl.$^6$ ............................. G01B 7/14; G01D 3/488; G01D 5/245; G01P 3/488
[52] U.S. Cl. ..................................... 324/207.21; 324/235
[58] Field of Search ...................... 324/207.21, 207.22, 324/207.24, 207.25, 252, 235, 174; 338/32 R

[56] References Cited

U.S. PATENT DOCUMENTS

| Re. 34,443 | 11/1993 | Takahashi et al. ................ 324/207.21 |
| 4,492,922 | 1/1985 | Ohkubo . |
| 5,134,371 | 7/1992 | Watanabe et al. . |
| 5,243,280 | 9/1993 | Kusumi ................................... 324/252 |
| 5,327,077 | 7/1994 | Honda . |

FOREIGN PATENT DOCUMENTS

| 3-48720 | 3/1991 | Japan . |
| 3-195970 | 8/1991 | Japan . |
| 5-249210 | 9/1993 | Japan . |

Primary Examiner—Walter E. Snow
Attorney, Agent, or Firm—Cushman Darby & Cushman IP Group of Pillsbury Madison & Sutro LLP

[57] ABSTRACT

A noncontact type rotation sensor, which can detect the rotational movement of a gear with high sensitivity and precision without causing any erroneous output, is disclosed. To a magnetic gear is applied a bias magnetic field by a bias magnet from the direction of the teeth of the gear. A sensor part disposed within the bias magnetic field comprises a substrate and a plurality of magneto-resistive elements mounted on the substrate in parallel to the teeth of the gear and electrically connected in series one after another. The sensor part detects the magnetic vector of the bias magnetic field varying according to the rotation of the gear as the composite value of the variations of the resistance values of the plurality of magneto-resistive elements connected in series one after another. The plurality of magneto-resistive elements are arranged with interval and width that enable the plurality of magneto-resistive elements to absorb the erroneous output caused to the variation waveforms of the respective resistance values during power supply.

34 Claims, 11 Drawing Sheets

MAGNETIC GEAR ROTATION SENSOR

CROSS REFERENCE TO RELATED APPLICATION

This application is based upon and claims the benefit of priority of the prior Japanese Patent Application No. 7-114786 filed on May 12, 1995, the contents of which are incorporated herein by reference.

BACKGROUND OF THE INVENTION

1. Field of the Invention

The present invention generally relates to a noncontact type rotation detector which detects the rotation of a gear or the like, which is the object of detection. More particularly, the present invention relates to the improvement of a rotation sensor in which a bias magnetic field is applied to a magnetic gear from the projecting direction of the teeth thereof and detects the rotational movement of the gear by making use of the variations of the resistance value of a magneto-resistive element, which is disposed within the bias magnetic field, according to the rotation of the gear.

2. Related Arts

In conventional noncontact type rotation sensors of this kind, the rotation of the gear or the like, which is an object of detection, is detected by making use of the variation of resistance value of a magneto-resistive element as illustrated in FIGS. 14A and 14B.

Specifically, as illustrated in FIG. 14A, when current is caused to flow through a magneto-resistive element MRE mounted on an insulating substrate, if the intensity of a magnetic field Bx in parallel with the direction of the current is increased, the resistance value of the magneto-resistive element MRE increases by approximately 0.3%, and if the intensity of a magnetic field by perpendicular to the direction of the current is increased, the resistance value of the magneto-resistive element MRE decreases by approximately 4.0%. However, if a magnetic field Bz perpendicular to the substrate is increased, the resistance value of the magneto-resistive element MRE does not vary. The relations between the intensities of the magnetic fields (the densities of the magnetic fluxes) and the variations of the resistance values are illustrated in FIG. 14B.

For this reason, with respect to the rotation sensor as described above, such an arrangement has been proposed that enabled the use of the magnetic field with the large variation of the resistance value in such a way that, as illustrated in FIG. 15, the magneto-resistive element MRE so disposed as to vary the magnetic vector in plane By-Bz and the magneto-resistive element MRE so disposed as to vary the magnetic vector in plane Bx-Bz were used and the output from a bridge composed of these two magneto-resistive elements MRE was detected. In other words, it has been studied that the disposition plane of the magneto-resistive elements MRE was positioned in parallel with the disposition plane of the bias magnet BM ("parallel arrangement") so that the magneto-resistive element MRE could be in parallel with the tooth crest of the gear G, and thereby the rotation of the gear G was detected.

By parallelly disposing the magneto-resistive element MRE as described above, the variation of the resistance value of the magneto-resistive element MRE according to the angular variation of the magnetic vector due to the rotation of the gear G is in such a state as illustrated in FIGS. 16A through 16C.

Specifically, the variation of the resistance value of the magneto-resistive element MRE according to the angular variation of the magnetic vector changes as illustrated in FIG. 16A. On the other hand, the angle of the magnetic vector of the bias magnetic field according to the rotation of the gear G cyclically changes as illustrated in FIG. 16B according to the approach and retreat of each tooth. Therefore, the resistance value of the magneto-resistive element MRE cyclically changes according to the rotation of the gear G as illustrated in FIG. 16C.

Here, as illustrated in FIG. 16B, the angular variation of the magnetic vector has both positive and negative changes in the rotational direction of the gear G with respect to the direction perpendicular to the tooth crest of the gear G, i.e., centering around an angle of 0°, and therefore the output signal obtained (FIG. 16C) has two times the frequency against the variation of the magnetic vector.

SUMMARY OF THE INVENTION

However, with the variation characteristics of the resistance value of the magneto-resistive element MRE, there is a problem that as the sensor output is obtained within an area where the variation of the resistance value is comparatively small, the sensor output is small as a sensor output signal.

In view of this problem, it is an object of the present invention to provide a noncontact type rotation sensor which can obtain a large sensor signal, even if the magnitude of the angular variation of the magnetic vector remains unchanged.

Therefore, a noncontact type rotation sensor according to the present invention is characterized by comprising: a bias magnet for applying a bias magnetic field to a magnetic gear from a direction of the projection of a tooth of the gear; a magneto-resistive element group arranged within the bias magnetic field and within a plane which is in parallel with the crest of the tooth and in opposition to the crest of the tooth, the magneto-resistive element group being composed of a plurality of magneto-resistive elements which are arranged in parallel with each other and along a direction of the rotation of the gear and which are electrically connected in series one after another; and a power supplying means for supplying current that flows through the plurality of magneto-resistive elements connected in series one after another.

Further, the noncontact type rotation sensor according to the present invention is characterized in that a magnetic vector of the bias magnetic field varying according to the rotation of the gear is detected based on the composite value of all variations of resistance values of the respective magneto-resistive elements connected in series one after another.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
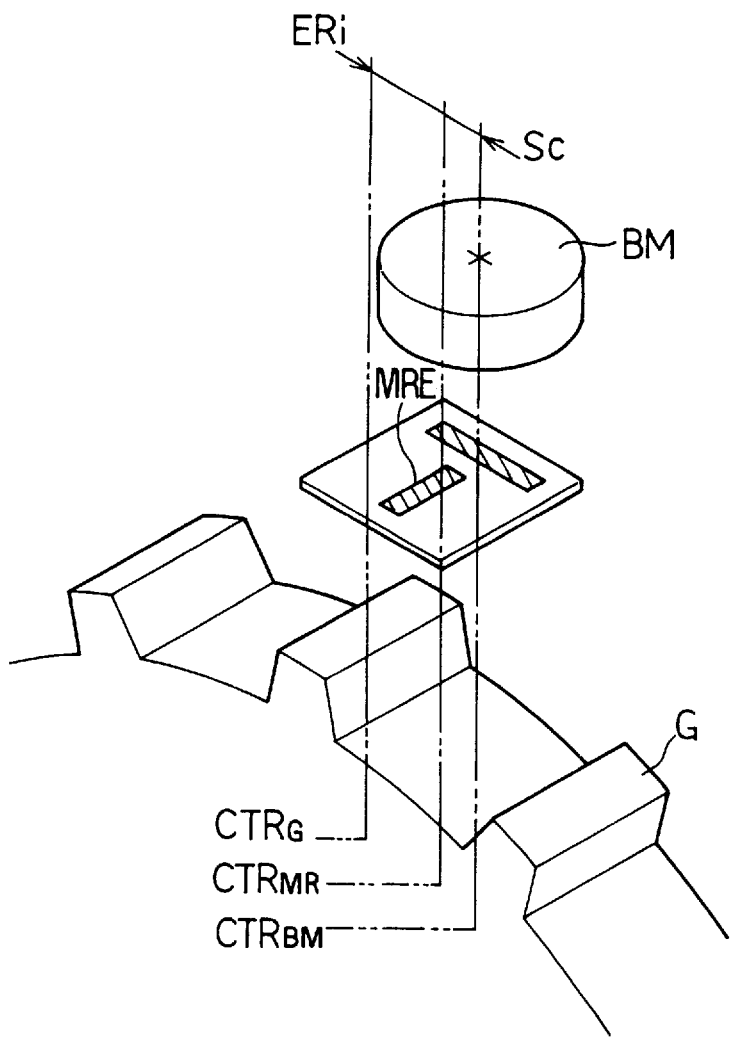
FIG. 1 is a perspective view schematically illustrating the construction of a rotation sensor manufactured on trial by the inventors of the present invention.
Figure 15:
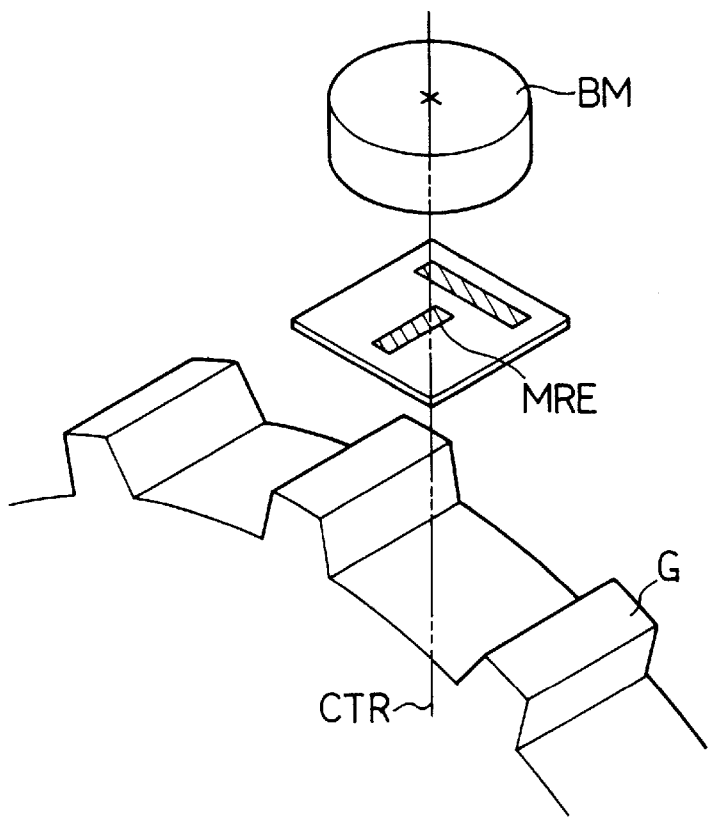
FIG. 15 is a perspective view illustrating the construction of a rotation sensor with the magneto-resistive elements parallelly arranged.
Figure 16A:
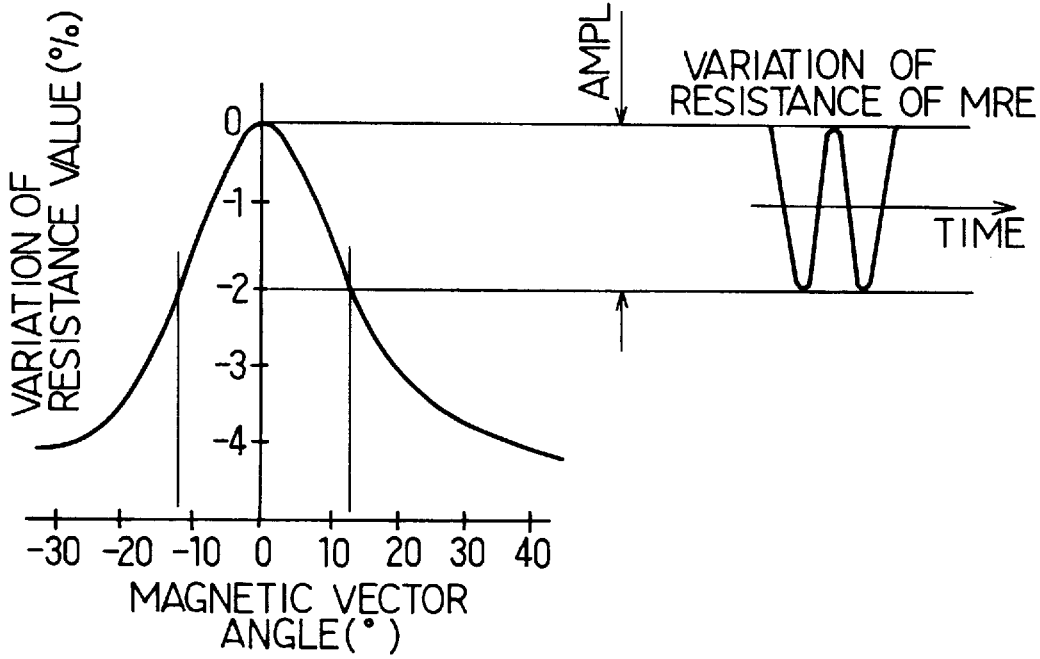
FIGS. 16A, 16B and 16C are graphs illustrating the variation characteristics of the resistance values of the magneto-resistive elements of the same construction as FIG. 15.
Figure 16C:
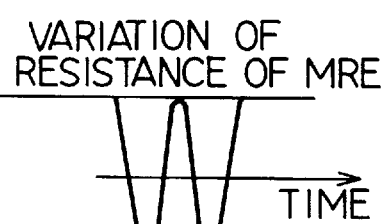
Figure 16B:
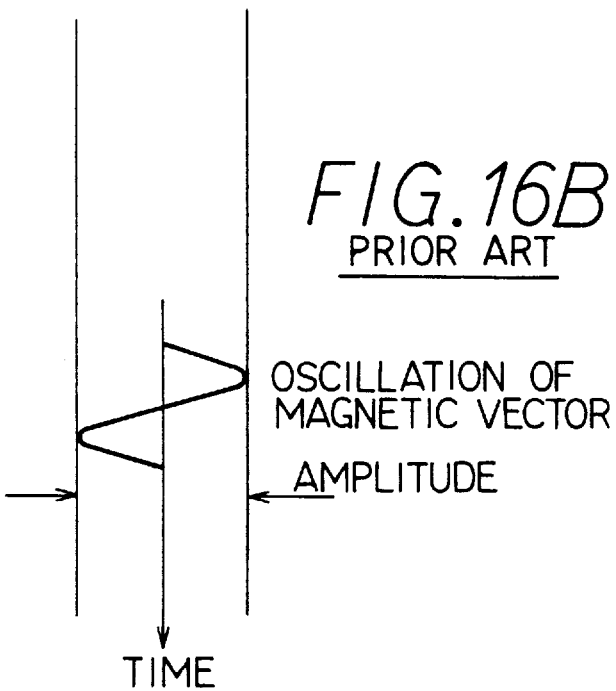

The inventors of the present invention have noticed that, in a parallel arrangement type rotation sensor illustrated in FIG. 15, the output of the rotation sensor could be obtained in an area where the variation of resistance value increased against the same variation of angle when the center of a bias magnet BM was purposely shifted from the center of a magneto-resistive element MRE. FIG. 1 illustrates this construction.

Specifically, the rotation sensor is so arranged that the center $CTR_{BM}$ of the bias magnet BM is shifted from the center $CTR_{MR}$ of the magneto-resistive element MRE by a shift of center Sc. In this arrangement, the variation of resistance value of the magneto-resistive element MRE according to the angular variation of magnetic vector due to the rotation of a gear G is illustrated in FIGS. 2A through 2E.

Figure 2:
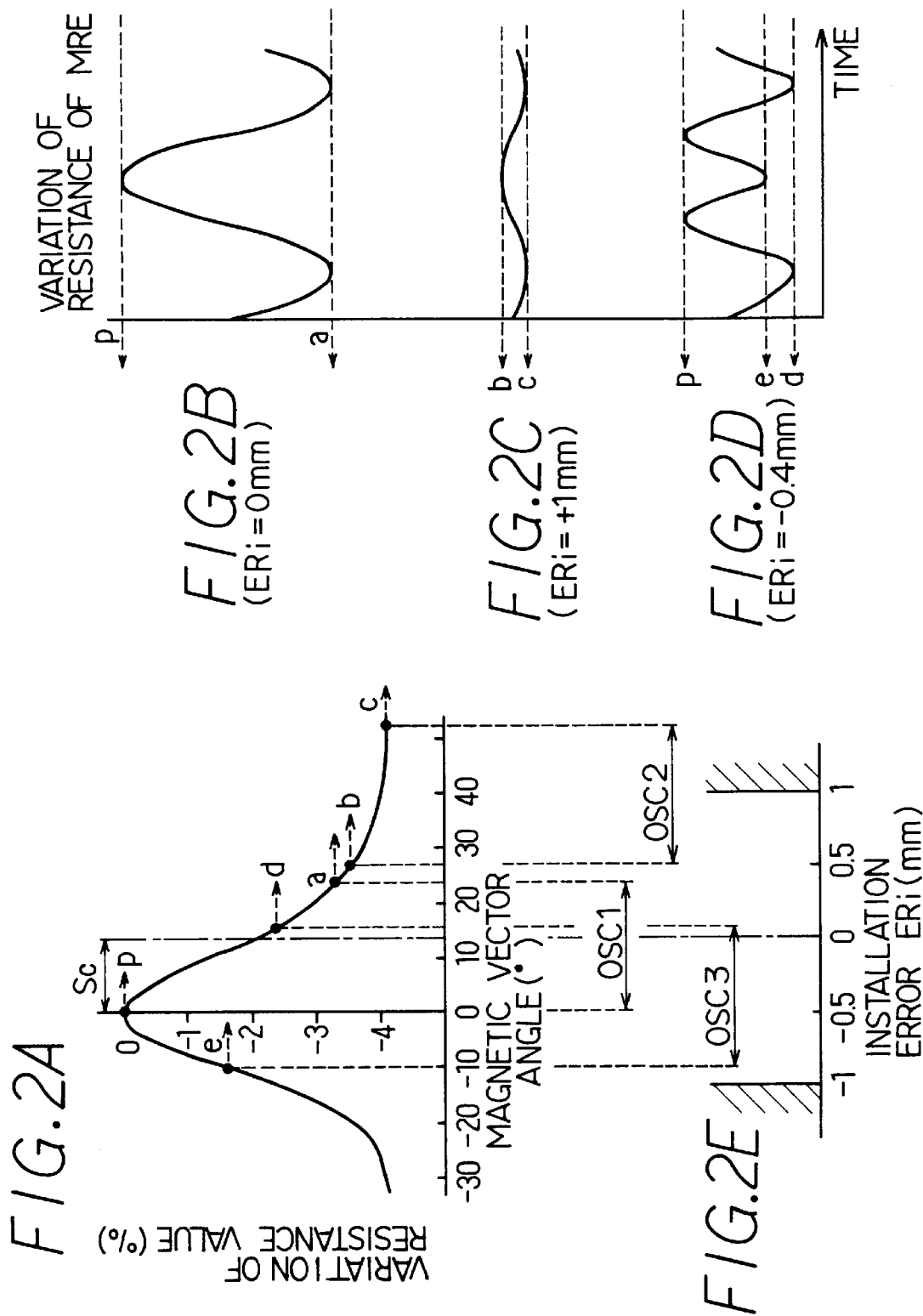
FIGS. 2A, 2B, 2C, 2D and 2E are graphs illustrating the variation characteristics of the resistance values of the magneto-resistive elements so constructed as illustrated in FIG. 1.

That is, as the oscillation angle of magnetic vector working on the magneto-resistive element MRE varies within an area indicated as "OSC1" in FIGS. 2A and 2E, the variation waveform of resistance value of the magneto-resistive element MRE shows such a large variation as illustrated in FIG. 2B. Here, in the construction illustrated in FIG. 1, to make use of a steeply slanted part of the variation ratio characteristic of resistance value described above, the shift of center Sc of the center $CTR_{BM}$ of the bias magnet BM from the center $CTR_{MR}$ of the magneto-resistive element MRE is determined.

In this case, by shifting the center $CTR_{BM}$ of the bias magnet BM, the cyclic variation of magnetic vector and the accompanying cyclic variation of the resistance value of the magneto-resistive element MRE become equal to each other in frequency.

In constructing the rotation sensor illustrated in FIG. 1, the bias magnet BM and a substrate on which the magneto-resistive element MRE is mounted can integrally be packaged, so that the positional relations between the two members can be adjusted with a high precision. On the other hand, as the gear G is mounted separately on the rotator, an installation error ERi between the magneto-resistive element MRE and the gear G may easily occur.

In the construction illustrated in FIG. 1, it was made clear that the installation error ERi had a sensitively-working effect on the signal output of the rotation sensor. The installation error ERi includes an error in distance, i.e., air gap between the magneto-resistive element MRE and the gear G and a positional error in the rotational direction of the gear G, i.e., an error between the center $CTR_{MR}$ of the magneto-resistive element MRE and a line $CTR_G$ in the projectional direction of the gear G originating at the rotational center of the gear G. For easier understanding, description will be given to the latter error.

When the installation error ERi of the magneto-resistive element MRE reaches "+1 mm," the oscillation angle of the magnetic vector shifts to an area indicated as "OSC2" in FIGS. 2A and 2E. For this reason, the variation of resistance value of the magneto-resistive element MRE substantially decreases as illustrated in FIG. 2C.

Conversely, when the installation error ERi of the magneto-resistive element MRE reaches "−0.4 mm," the oscillation angle of the magnetic vector shifts to an area indicated as "OSC3" in FIGS. 2A and 2E. In this case, if the magnetic vector described above oscillates to the maximum extent (22°), the resistance value, once increased, decreases from the peak of the characteristic waveform, and as illustrated in FIG. 2D, an "erroneous output" is caused. In other words, compared with a case with no installation error ERi, two times the number of pulses are outputted. This means that, due to difference in the magnitude of the installation error ERi from sensor to sensor, even in the same sensor, the detection output varies, and this will cause a serious inconvenience to the practical use of the rotation sensor.

Here, it should be noted that in such a construction of the rotation sensor with the magneto-resistive element MRE arranged in parallel, even when the air gap between the magnetically sensitive surface of the magneto-resistive element MRE and the crest part of the gear G is small, the magnetic vector easily causes the "erroneous output" due to the increased angle variation.

In view of the problem described above, the present invention has an object to provide a noncontact type rotation sensor which does not cause any erroneous output and which is highly sensitive, i.e., expectedly has a large output of the sensor.

In order to achieve this object, the noncontact type rotation sensor basically comprises: a bias magnet for applying a bias magnetic field to a magnetic gear from a direction of the projection of a tooth of the gear; a magneto-resistive element group arranged within the bias magnetic field and within a plane which is in parallel with the crest of the tooth and in opposition to the crest of the tooth, the magneto-resistive element group being composed of a plurality of magneto-resistive elements which are arranged in parallel with each other and along a direction of the rotation of the gear and which are electrically connected in series one after another; and a power supplying means for supplying current that flows through the plurality of magneto-resistive elements connected in series one after another, and is further characterized in that a magnetic vector of the bias magnetic field varying according to the rotation of the gear is detected based on the composite value of all variations of resistance values of the respective magneto-resistive elements connected in series one after another.

As described above, in the sensor with the magneto-resistive element "parallelly arranged," although it is possible to detect the rotation of the gear at a high sensitivity by making use of a large variation of resistance value based on the magnetic field By described above, depending on the installation error and air gap, the erroneous output may be caused in the variation waveform of resistance value to such an extent that the sensor can not practically be used.

To solve this problem, according to the basic construction of the present invention, although the magneto-resistive element is "parallelly arranged," a plurality of the same magneto-resistive elements are arranged as described above and electrically connected in series one after another so that the magnetic vector of the bias magnetic field varying according to the rotation of the gear can be detected based on the composite values of all the variations of resistance value of the respective magneto-resistive elements.

That is, even if erroneous output is caused in the variation waveforms of resistance values of some or all of the magneto-resistive elements, by arranging the plurality of magneto-resistive elements parallel to the tooth of the gear in such a way that the plurality of magneto-resistive elements are shifted one after another in the rotational direction of the gear, the variation waveform of the whole resistance value of the magneto-resistive element group, i.e., the composite waveform of the resistance values of the respective magneto-resistive elements, compensates for the parts where an erroneous output occurs in particular magneto-resistive elements, and the variation of magnetic vector is detected as a preferable waveform with no erroneous output in correspondence to each tooth of the gear.

Furthermore, according to the construction of the sensor as described above, as the respective magneto-resistive elements to be connected in series one after another are "parallelly arranged" as described above, a highly sensitive detection of rotation can be achieved by making use of large variations of the resistance values based on the magnetic field By. In addition, in collaboration with such highly sensitive detection of rotation, based on the variation waveforms of the resistance values of the magneto-resistive elements with no "erroneous output," the amplitudes (outputs) of the composite waveform can also be increased.

Also in this case, as the plurality of magnetic resistance elements are arranged in shifted positions one after another in the rotational direction of the gear, even if there is any installation error described above, only the positions of the magneto-resistive elements varying the resistance values containing erroneous outputs vary. Accordingly, the effect of the installation error on the composite waveform of the resistance element group is small, and therefore, the positional restrictions can substantially be eased.

Here, in this case, in the basic construction described above, if the interval and number of the magnetic resistance elements composing the magnetic element group are set to such values that enable the erroneous output caused to the variation waveforms of the resistance values to be absorbed by the composite waveform, the absorption of the erroneous output by the composite waveform can more exactly be achieved, the signal waveform can be made more enveloped, and as a result, the rotation of the gear can be detected at a higher precision.

In this case, it has been confirmed by the inventors of the present invention that such a construction where:

a) the plurality of magneto-resistive elements were arranged within a range of length from 1.5 to 1.5 times as long as the crest length of the gear tooth in the rotational direction (i.e., tooth thickness) with the interval and for the number described above; or, in the alternative, b) the plurality of magneto-resistive elements were arranged within a range of length from 25% to 75% of the tooth pitch of the gear with the interval and for the number described above, was effective in obtaining the composite variation waveform of the resistance values with no erroneous output in correspondence to each tooth in detecting the rotation of the gear irrespective of the shape thereof. Here, the former construction a) is effective when the gear, which is the object of detection, has square or equivalently shaped teeth, while the latter construction b) is effective when the gear to be detected has triangular or equivalently shaped teeth.

In each of the constructions described above, when the power supplying means is constructed as a means for driving the magneto-resistive element group composed of the plurality of magneto-resistive elements connected in series one after another with a constant current, the composition of the rotation sensor can be simplified compared with a case where a bridge circuit is jointly used. That is, in this case, by providing the bias magnet and the plurality of magneto-resistive elements connected in series one after another as basic components, an output corresponding to the composite variation value of the resistance values of the respective magneto-resistive elements can be obtained, and based on the output thus obtained, the rotation of the gear can precisely be detected.

According to the construction of the rotation sensor described above, however, as the variations of the resistance values can be obtained with the highest sensitivity by parallelly arranging the magneto-resistive elements, even if the construction includes a bridge circuit for joint use, the rotation of the gear can be detected with a sufficiently high sensitivity.

In other words, the magneto-resistive elements can form a half-bridge circuit by being connected in series with a proper resistor. To drive the half-bridge circuit, the power supplying means may be a specified voltage applied at one end of the series connected magneto-resistive elements while making the other end grounded. Also in this construction, output corresponding to the composite value of the resistance values of the respective magneto-resistive elements can be obtained with a high sensitivity through the bridge circuit, and based on the output thus obtained, the rotation of the gear can precisely be detected.

Here, in this case, if the resistor described above is constructed by the second magneto-resistive element group in which one or more magneto-resistive elements are arranged in opposition to the tooth of the gear and at right angles to the former magneto-resistive elements, each resistance element composing the half-bridge circuit has the equal temperature characteristics. Therefore, even if the ambient temperature varies, the output precision that the bridge circuit should have can preferably be maintained.

Next, the present invention will be described referring to specific examples illustrated in the appended drawings.

FIRST EMBODIMENT

Figure 3:
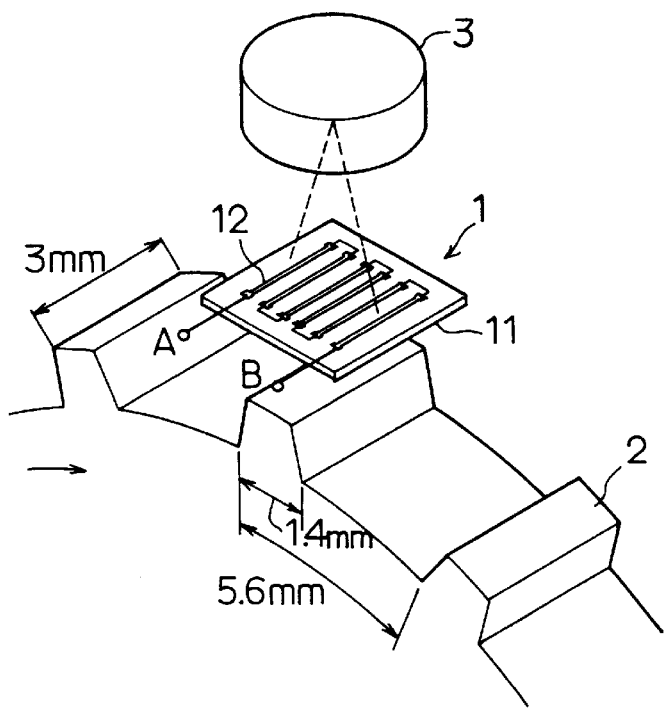
FIG. 3 is a perspective view illustrating the construction of a rotation sensor according to a first embodiment of the present invention.

FIG. 3 illustrates the first embodiment of the noncontact type rotation sensor according to the present invention.

As illustrated in FIG. 3, the rotation sensor of this embodiment is constructed with a bias magnet 3 which applies a bias magnetic field to a gear 2 of magnetic substance from the direction of the teeth of the gear 2, and a sensor part 1 which is disposed within the bias magnetic field thus applied and detects the rotational movement of the gear 2.

The sensor part 1 is "parallelly arranged," and is designed to detect the magnetic vector of the bias magnetic field varying according to the rotation of the gear 2 based on the variations of the resistance values of the respective magneto-resistive elements. The plan construction of the sensor part 1 is such that is illustrated in FIG. 4.

Figure 4:
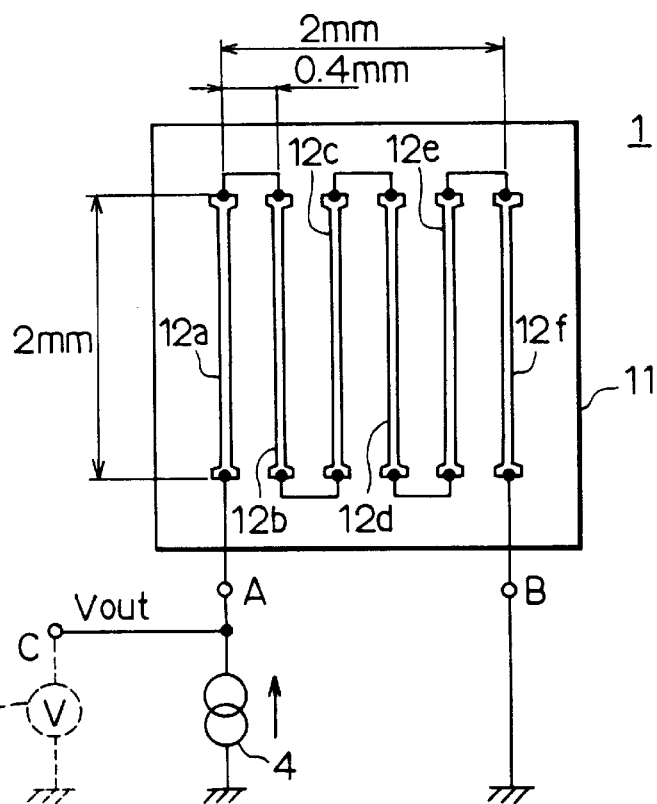
FIG. 4 is a plan view illustrating the arrangement of the magneto-resistive elements of the sensor part of the first embodiment.

That is, the sensor part 1 is, as illustrated in FIG. 4, constructed with an insulating substrate 11 disposed in opposition to the tooth crest of the gear 2, and six magneto-resistive elements 12 (12a through 12f) mounted on the insulating substrate 11 in opposition to the teeth of the gear 2 and electrically connected in series one after another along the rotational direction of the gear 2.

As also illustrated in FIG. 4, in the sensor part 1, a terminal A is connected to a constant current power source 4, and a terminal B is grounded. A terminal C is an output terminal. When the gear 2 is in rotation and the magneto-resistive elements 12 disposed within the bias magnetic field are subjected to constant current drive, the following magneto-resistance effects are obtained:

(1) The magnetic vector within the bias magnetic field varies in angle according to the rotation of the gear 2. That is, the magnetic vector of the magnetic field emitted from the bias magnet 3 heads for the nearest tooth of the gear 2. Therefore, supposing that the gear 2 rotates in the direction indicated by a directional line with arrow in FIG. 3 (rightwardly viewed in this figure), for example, the magnetic vector repeats angular variation in a direction of "from the left under in this figure to the right under in the figure" in correspondence to the movement of each tooth in a direction of "approach to retreat."

(2) According to the angle variation of the magnetic vector, the resistance values of the magneto-resistive elements 12 vary. That is, from the magneto-resistive element 12a through the magneto-resistive element 12f, the variations of the respective resistance values in correspondence to the "4.0% reduction of the resistance value" described above is repeated.

(3) However, as these magneto-resistive elements 12a through 12f are electrically connected in series one after another, the variations of the resistance values of the respective magneto-resistive elements are added up, and the composite value (waveform) thereof appears at the terminal C.

In correspondence to these magneto-resistive effects of the magneto-resistive elements 12 (12a through 12f), a voltage Vout is outputted.

Figures 5A, 5B:
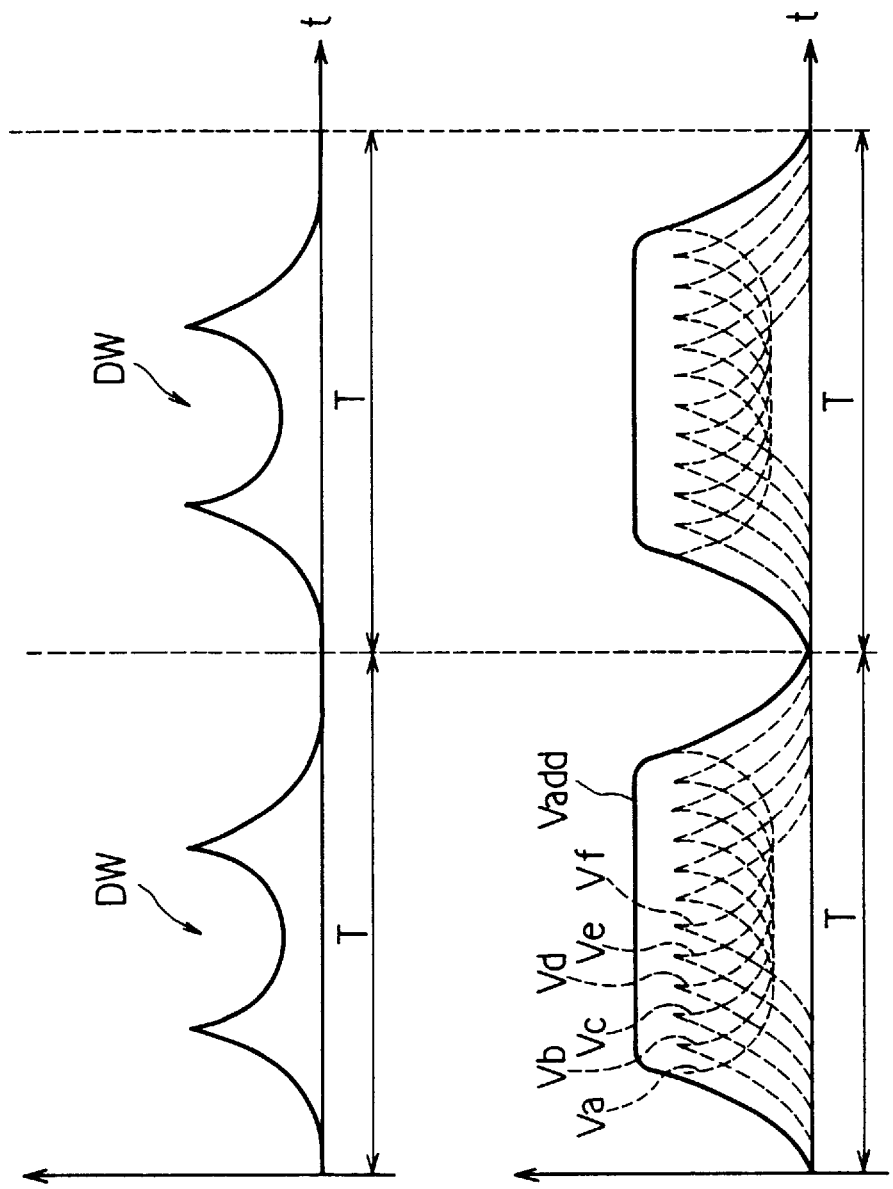
FIGS. 5A and 5B are time charts illustrating the principle of absorbing erroneous output according to the first embodiment.
Figure 6A:
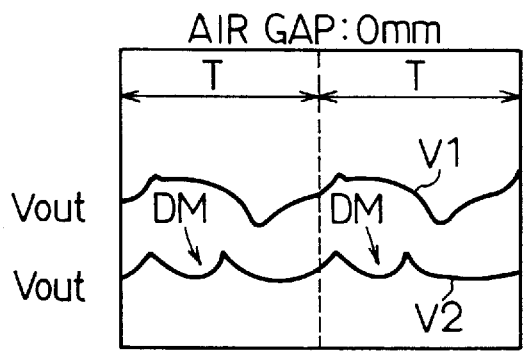
FIGS. 6A, 6B, 6C, 6D and 6E are time charts illustrating the output characteristics of the rotation sensor according to the first embodiment actually manufactured by the inventors of the present invention.
Figure 6B:
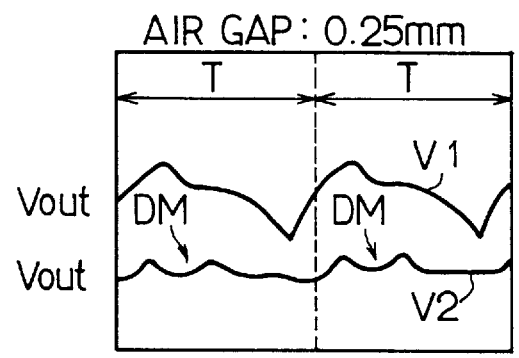
Figure 6C:
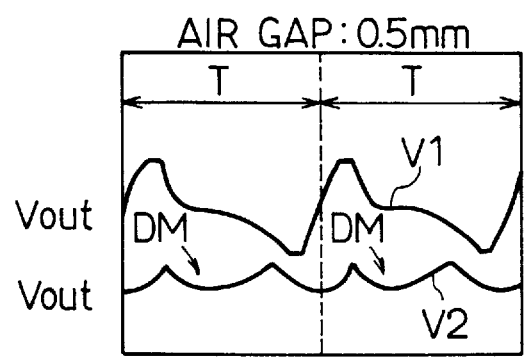
Figure 6D:
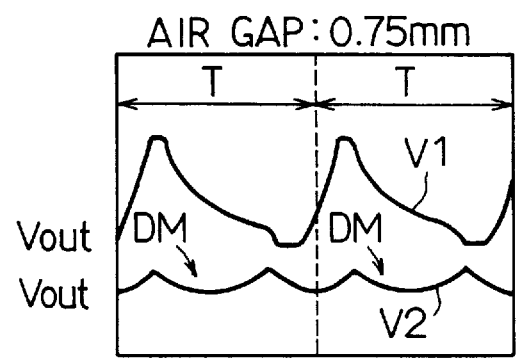
Figure 6E:
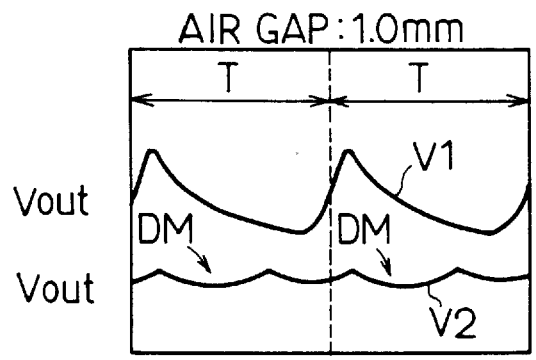

FIGS. 5A and 5B schematically illustrate the principle of absorbing erroneous output by the rotation sensor of the first embodiment.

When the magnetic vector within the bias magnetic field varying according to the rotation of the gear 2 is detected based on the composite value of the variations of the resistance values of the respective magneto-resistive elements 12a through 12f connected in series one after another, the erroneous output caused in the variation waveforms of the resistance values due to the "parallel arrangement" described above is preferably be absorbed and avoided as illustrated in FIG. 5B.

Specifically, when only one magneto-resistive element is "parallelly arranged," such an erroneous output DW that is illustrated in FIG. 5A is caused, which is illustrated so with the output converted into a waveform of the output Vout, in every cycle T in correspondence to the tooth pitch of the gear 2. However, when the six magneto-resistive elements 12a through 12f are arranged with such an interval that can mutually compensate for the erroneous output, as illustrated in FIG. 5B, which is illustrated with the output converted into a waveform of the output Vout every cycle T in correspondence to the tooth pitch of the gear 2, the erroneous output DW can preferably be avoided by a composite waveform Vadd of the waveforms Va through Vf corresponding to the six magneto-resistive elements 12a through 12f.

Here, as the magneto-resistive elements 12a through 12f are arranged in shifted positions one after another in the rotational direction of the gear 2, in actuality, the variations of the resistance values caused by the shift in the oscillation angle of the magnetic vector at the respective magneto-resistive elements 12a through 12f are added to the composite waveform Vadd, and accordingly the variation in each moment of the composite waveform Vadd becomes more complicated. For example, even if the erroneous output is contained in the variation waveform of the resistance value of a specific magneto-resistive element, the erroneous output is not contained in the variation waveform of resistance value of another magneto-resistive element that is located away from the specific magneto-resistive element, but instead, the signal amplitude of the another magneto-resistive element is larger than that of the specific magneto-resistive element. In this way, the erroneous output is continuously compensated for. In addition, the composite waveform Vadd is reshaped so as to make the wave height value thereof larger.

The inventors of the present invention actually manufactured on trial the rotation sensor according to the first embodiment and tried the measurement of the output characteristics of the trial rotation sensor. The results will now be described.

In this trial manufacturing, as the gear 2 for use in detection of the rotation thereof, a gear with the maximum diameter of "85 mm" and 48 teeth provided thereon with a crest occupied ratio (the ratio of the crest length, i.e., tooth thickness, to the tooth pitch) of 25% was used. In this case, as also illustrated in FIG. 3, the tooth pitch was "5.6 mm," and the tooth thickness was "1.4 mm," and incidentally, the thickness of the gear was "3 mm."

For such gear 2, as the sensor part 1, as also illustrated in FIG. 4, a sensor part in which the magneto-resistive elements 12a through 12f, each having a length of "2 mm," were parallelly arranged on the substrate 11 with an interval of "0.4 mm" over a width of "2 mm."

Air gaps between the crests of the respective teeth of the gear 2 and the bottom surface of the sensor part 1 (precisely, the surfaces of the magneto-resistive elements 12a through 12f; actually, the surfaces of these magneto-resistive elements 12a through 12f were arranged in opposition to the gear 2) were set to "0 mm," "0.25 mm," "0.5 mm," "0.75 mm" and "1.0 mm" respectively, and the output Vout was measured with a voltmeter (an oscilloscope) 5 mounted on the terminal C. As a result, the characteristics illustrated in FIGS. 6A through 6E could be obtained.

Here, in FIGS. 6A through 6E, the respective characteristic lines V indicate the output characteristics when all six magneto-resistive elements 12a through 12f connected in series one after another were used, while the respective characteristic lines V2 indicate the output characteristics when only one of these magneto-resistive elements 12a through 12f (e.g., the magneto-resistive element 12a) was used. The cycle T indicates, as described above, the period corresponding to the tooth pitch of the gear 2.

As evident from FIGS. 6A through 6E, at least within a range of the air gaps from "0 mm" to "1.0 mm," the erroneous output DM caused when only one magneto-resistive element was used was preferably absorbed by using the six magneto-resistive elements 12a through 12f connected in series one after another like the rotation sensor of the first embodiment.

Furthermore, by using the six magneto-resistive elements 12a through 12f connected in series one after another, the dynamic ranges of the respective output waveforms were also substantially improved, so that the binary waveform reshaping processing can be performed extremely easily and precisely.

As described above, according to the rotation sensor of the first embodiment, based on the composite variation waveform of the resistance values of the respective six magneto-resistive elements connected in series one after another, it is possible to detect the variation of the magnetic vector as a preferable waveform with no erroneous output for each tooth of the gear 2.

In the prototype described above, the six magneto-resistive elements 12a through 12f were arranged with an interval of 0.4 mm over a width of 2 mm. However, it has been confirmed through experiments that the limiting air gap causing the erroneous output and the mounting interval or mounting width of the magneto-resistive elements were in such relations as illustrated in FIG. 7.

Figure 7:
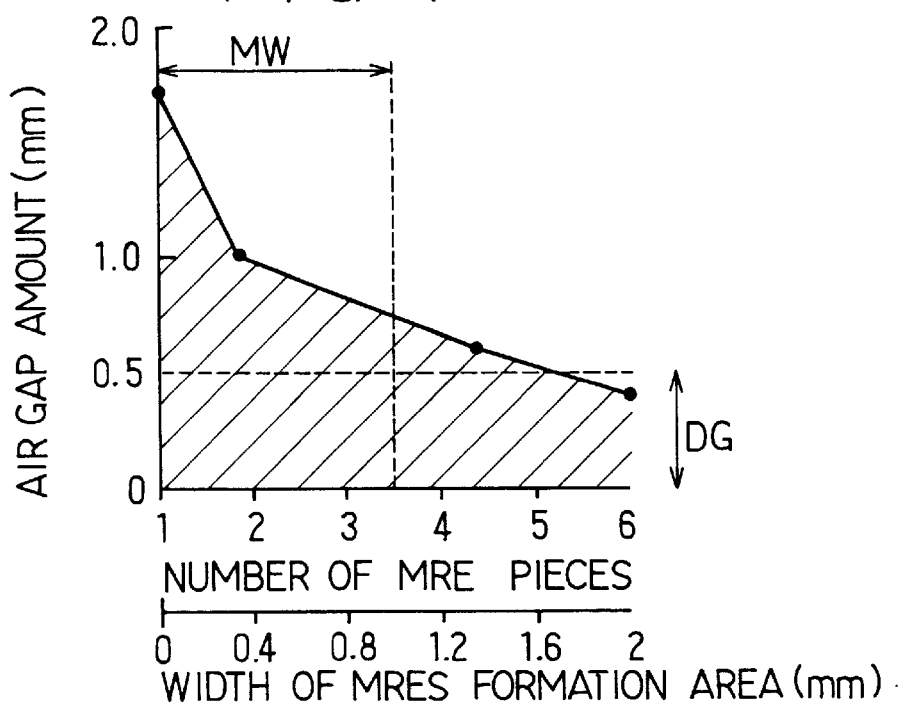
FIG. 7 is a graph illustrating the relations between the limiting air gap causing erroneous output and the magneto-resistive element arrangement.

That is, in FIG. 7, the area shaded with slanting lines is an area where the erroneous output occurs. From FIG. 7, it is understood that even if the air gap is small, if the number of the magneto-resistive elements arranged is large, the erroneous output can be avoided. Conversely, if a large air gap can be provided, the number of the magneto-resistive elements arranged may be small.

In this embodiment with the magneto-resistive elements disposed with an interval of "0.4 mm," the crest length "1.4 mm" of the gear 2 is equivalent to the mounting width "3.5 pieces" of the magneto-resistive elements. In FIG. 7, this mounting width is indicated as MW.

Specifically, when the air gap can be secured for around "1 mm," approximately two magneto-resistive elements can be mounted within a width approximately 0.5 times as wide as the crest length, or the tooth thickness, and this can avoid the erroneous output. When the air gap can be secured for around "0.5 mm," approximately four or five magneto-resistive elements can be mounted within a width approximately 1 to 1.5 times as wide as the crest length, or the tooth thickness, and this can also avoid the erroneous output. In the rotation sensor of this embodiment, by providing the six magneto-resistive elements 12a through 12f, more than the number of the magneto-resistive elements described above, the erroneous output can reliably be avoided irrespective of the size of the air gap.

Here, in FIG. 7, "DG" indicates "dead gap" necessitated when an installation of the rotation sensor. In actuality, due to the structural restrictions of the housing for the rotation sensor, the air gap can not be set to less than approximately "0.5 mm," which is equivalent to the dead gap DG. In other words, by mounting the magneto-resistive elements over the width wider than the crest length described above with an apparent air gap of approximately "0.5 mm," which will be lost by the dead gap DG, the erroneous output can be avoided.

On the other hand, as described above, the dynamic range of the output waveform can substantially be improved by the rotation sensor of this embodiment. Specifically, as illustrated in FIG. 8, the range, i.e., the sensitivity, largely depends on the air gap.

Figure 8:
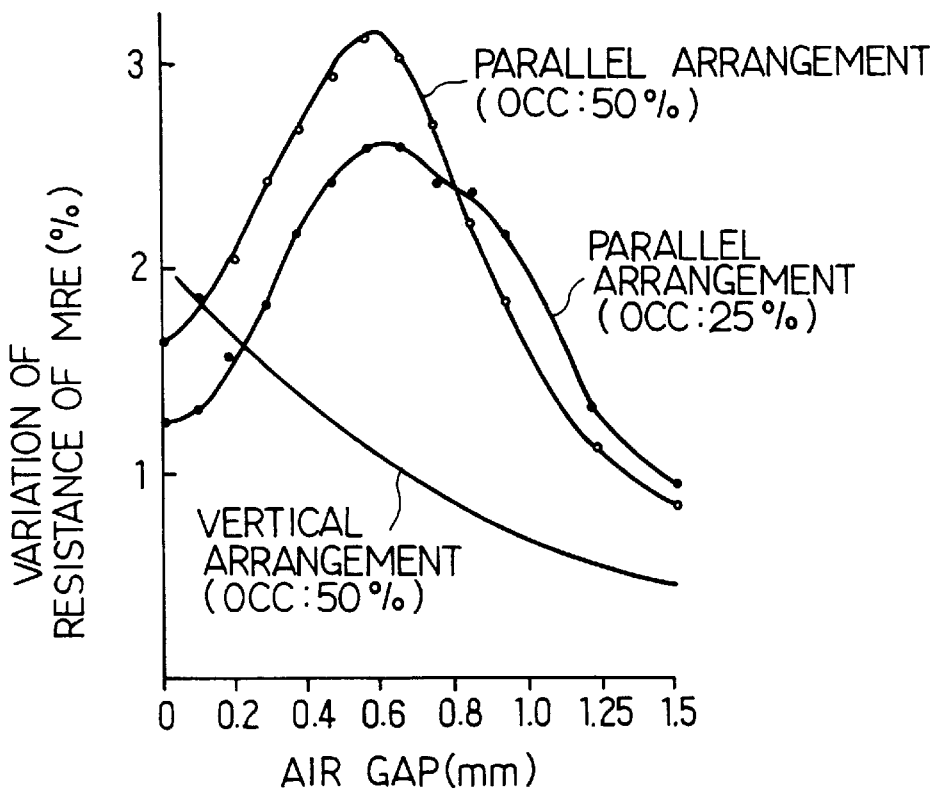
FIG. 8 is a graph illustrating the relations between the variations of the resistance values of the magneto-resistive elements and the air gap.
Figure 14A:
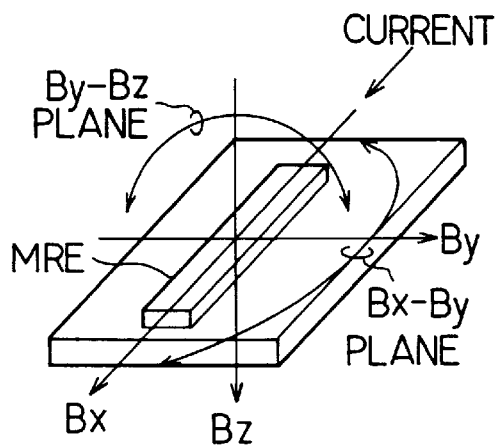
FIGS. 14A and 14B are a perspective view and a graph, respectively, illustrating the variation characteristics of the resistance value of the magneto-resistive element.
Figure 14B:
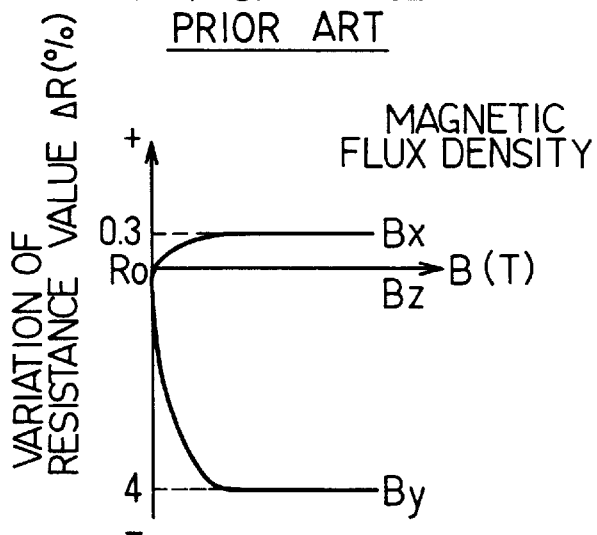

FIG. 8 illustrates the relations between the variation amount of the resistance values of the magneto-resistive elements and the air gap in the rotation sensor of this embodiment. Despite some difference in the crest occupied ratio Occ of the gear 2, particularly within an air gap range of "0.5–1.0 mm," an extremely high sensitivity can be obtained, which is evident from FIG. 8. This sensitivity is approximately two to three times the sensitivity of the rotation sensor of "45° vertical arrangement type" (Refer to the Japanese Unexamined Patent Publication No. 3-195970) jointly illustrated in FIG. 8. From this fact, it is understood that the binary waveform reshaping processing, which is subsequently applied to the sensor output, can easily and precisely be performed. Here, the "45° vertical arrangement type" means such an arrangement that the substrate on which the magneto-resistive elements are mounted is disposed perpendicular to the magnet surface to vary the magnetic vector on plane Bx-By in FIG. 14A and furthermore the magneto-resistive elements are slanted by 45° from the vertical direction.

Also in the rotation sensor of this embodiment, as described above, as the magneto-resistive elements 12a through 12f are disposed in shifted positions one after another in the rotational direction of the gear 2, there is little effect from the installation error, and the positional restrictions can substantially be eased.

SECOND EMBODIMENT

Figure 9:
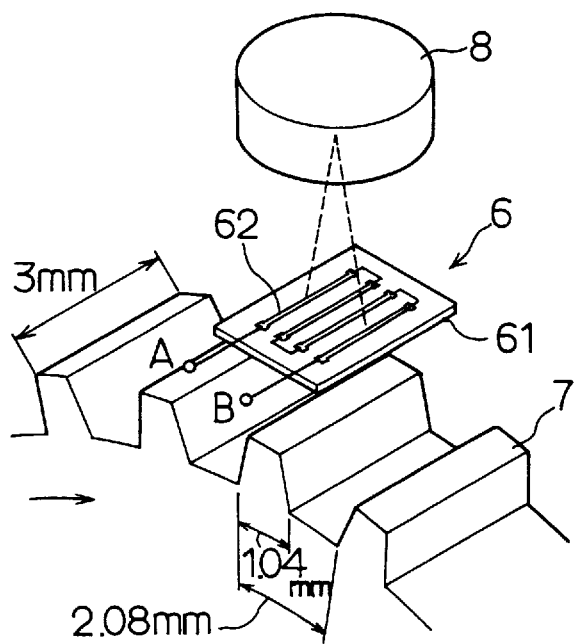
FIG. 9 is a perspective view illustrating the construction of a rotation sensor according to a second embodiment of the present invention.

FIG. 9 illustrates the second embodiment of the noncontact type rotation sensor related to the present invention.

As illustrated in FIG. 9, also in the rotation sensor of this embodiment, basically, a bias magnet 8 is provided to apply a bias magnetic field to a magnetic gear 7, which is the object of detection, from the tooth direction of the gear 7, and a sensor part 6 is also provided within the bias magnetic field thus applied for detecting the rotational movement of the gear 7.

Figure 10:
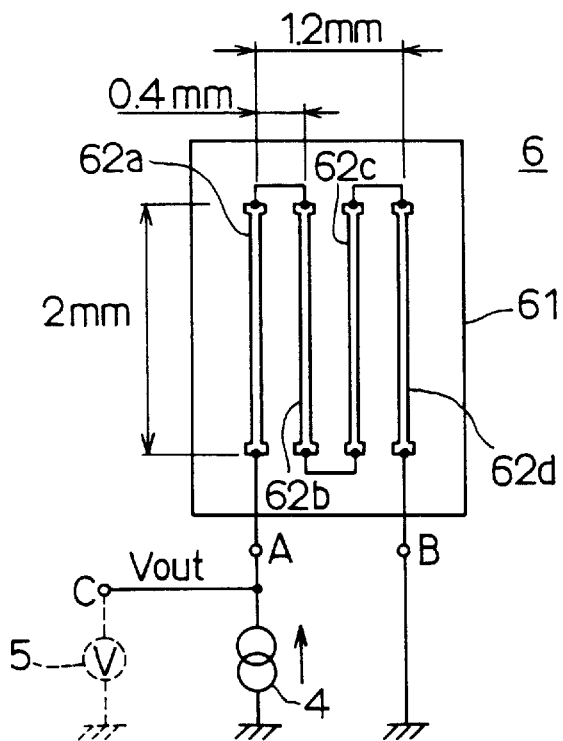
FIG. 10 is a plan view illustrating the arrangement of the magneto-resistive elements of the sensor part of the second embodiment.

Here again, the sensor part 6 is designed to detect the magnetic vector of the bias magnetic field varying according to the rotation of the gear 7 based on the variations of the resistance values of the magneto-resistive elements "parallelly arranged." The plan construction of the sensor part 6 is illustrated in FIG. 10.

Specifically, the sensor part 6 is, as illustrated in FIG. 10, composed of an insulating substrate 61 disposed in opposition to the tooth crest of the gear 7 and four magneto-resistive elements 62 (62a through 62d) disposed on the insulating substrate 61 in parallel with the tooth crest of the gear 7 and electrically connected in series one after another in the rotational direction of the gear 7.

Also, as illustrated in FIG. 10, in the sensor part 6, the terminal A is connected to the constant current power source 4, and the terminal B is grounded. The terminal C is an output terminal. The voltage Vout outputted from the terminal C in correspondence to the magneto-resistive effect of the magneto-resistive elements 62 is also in conformity to the voltage outputted from the rotation sensor of the first embodiment. Therefore, any duplicated description will be omitted herein.

The inventors of the present invention actually manufactured on trial the rotation sensor according to the second embodiment as well, and tried the measurement of the output characteristics of the trial rotation sensor. The results will now be described.

In this trial making, as the gear 7 for use in detection of the rotation thereof, a gear with the maximum diameter of "85 mm" and 64 teeth provided thereon with a crest occupied ratio (the ratio of the crest length to the tooth pitch) of 50% was used. In this case, as also illustrated in FIG. 9, the tooth pitch was "2.08 mm," and the crest length was "1.04 mm," and incidentally, the thickness of the gear was "3 mm."

For such gear 7, as the sensor part 6, as also illustrated in FIG. 10, a sensor part in which the magneto-resistive elements 62a through 62d, each having of a length of "2 mm," were parallelly arranged on the substrate 61 with an interval of "0.4 mm" over a width of "1.2 mm."

Air gaps between the crests of the respective teeth of the gear 7 and the bottom surface of the sensor part 6 (precisely, the surfaces of the magneto-resistive elements 62a through 62d; actually, the surfaces of these magnetic resistance elements 62a through 62d were arranged in opposition to the gear 7) were set to "0 mm," "0.25 mm," "0.5 mm," "0.75 mm" and "1.0 mm" respectively, and the output Vout was measured with a voltmeter (an oscilloscope) 5 mounted on the terminal C. As a result, the characteristics illustrated in FIGS. 11A through 11E could be obtained.

Here, also in FIGS. 11A through 11E, the respective characteristic lines V1 indicate the output characteristics when all the four magneto-resistive elements 62a through 62d connected in series one after another were used, while the respective characteristic lines V2 indicate the output characteristics when only one of these magneto-resistive elements 62a through 62d (e.g., the magneto-resistive element 62a) was used. The cycle T indicates, as described above, the period corresponding to the tooth pitch of the gear 7.

Figure 11A:
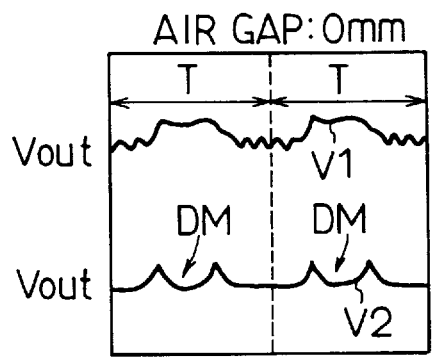
FIGS. 11A, 11B, 11C, 11D and 11E are time charts illustrating the output characteristics of the rotation sensor according to the second embodiment actually manufactured by the inventors of the present invention.
Figure 11B:
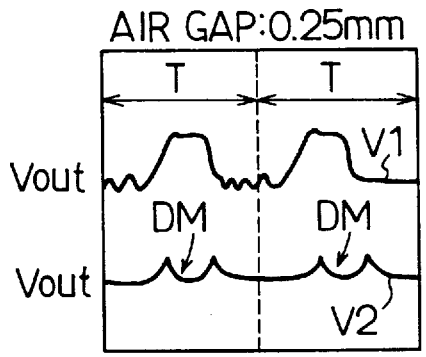
Figure 11C:
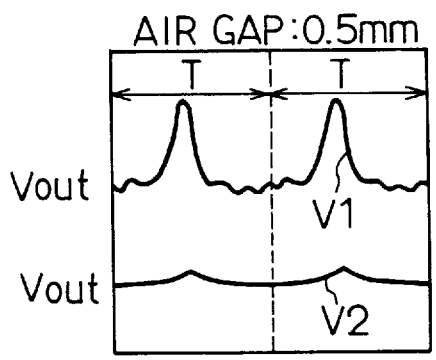
Figure 11D:
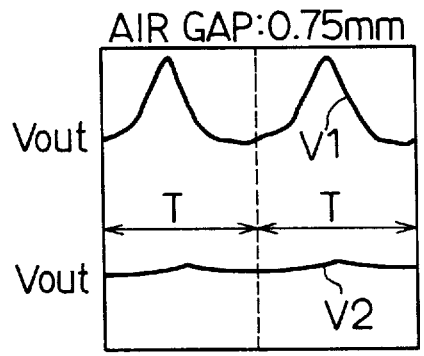
Figure 11E:
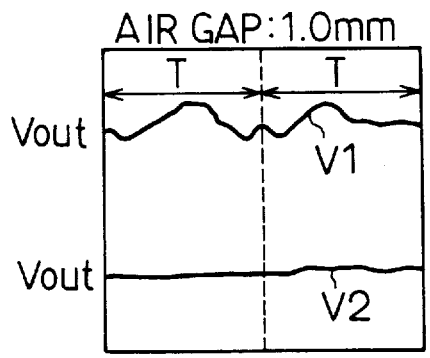

As evident from FIGS. 11A through 11E, when only one magneto-resistive element was used, within a range of the air gaps from "0 mm" to "0.25 m" illustrated in FIGS. 11A and 11B, output from which the rotation of the gear 7 could be recognized was obtained, but within a range of the air gaps from "0.5 mm" to "1.0 mm" illustrated in FIGS. 11C through 11E, output from which the rotation of the gear 7 could be recognized could hardly be obtained.

Also, when only one magneto-resistive element was used, although an output that can recognize the rotation of the gear 7 was obtained within a range of the air gaps from "0 mm" to "0.25 mm," it was difficult to avoid the erroneous output DM throughout the above range.

On the other hand, by using the four magneto-resistive elements 62a through 62d connected in series one after another like the rotation sensor of the second embodiment, an output with no erroneous output throughout the range of the air gaps from "0 mm" to "1.0 mm" and of a preferable level for recognizing the rotation of the gear 7 (the variation of the magnetic vector) could be obtained.

That is, according to the rotation sensor of the second embodiment as well, it is evident from the measurement results illustrated in FIGS. 11A through 11E, the erroneous output could preferably be avoided, and the dynamic ranges of the respective output waveforms were substantially improved.

In the prototype described above, in opposition to the gear 7 with a crest length of each tooth of 1.04 mm, the four magneto-resistive elements 62a through 62d were arranged with an interval of 0.4 mm over a width of 1.2 mm. The conditions that could avoid the erroneous output illustrated in FIG. 7 could evidently be fulfilled by this arrangement as well. That is, also in this case, by disposing the magneto-resistive elements over the width wider than the crest length described above with an apparent air gap of approximately "0.5 mm" which will be lost by the dead gap DG, and this can preferably avoid the erroneous output. Furthermore, those conditions illustrated in FIG. 7, that is:

(1) even if the air gaps are small, if the number of the magneto-resistive elements arranged is large, the erroneous output can be avoided, and (2) if the air gaps are large, the number of the magneto-resistive elements arranged may be small, are the same as those in the second embodiment.

Also in the rotation sensor of the second embodiment, as described above, as the magneto-resistive elements 62a through 62d are disposed in shift one after another in the rotational direction of the gear 7, there is little effect from the installation error, and the positional restrictions can substantially be eased.

THIRD EMBODIMENT

In any of the first and second embodiments described above, the magneto-resistive elements 12a through 12f or 62a through 62d are subjected to constant current drive by the constant current power source 4.

For this reason, compared with a case where the bridge circuit is jointly used, the construction of the rotation sensor can be simplified.

However, according to the structure of the rotation sensor of these embodiments, in which the erroneous output can be avoided and a sufficient sensitivity can be obtained, even if the construction with the bridge circuit is adopted, the rotation of the gear can be detected with a sufficiently high precision.

Figure 12:
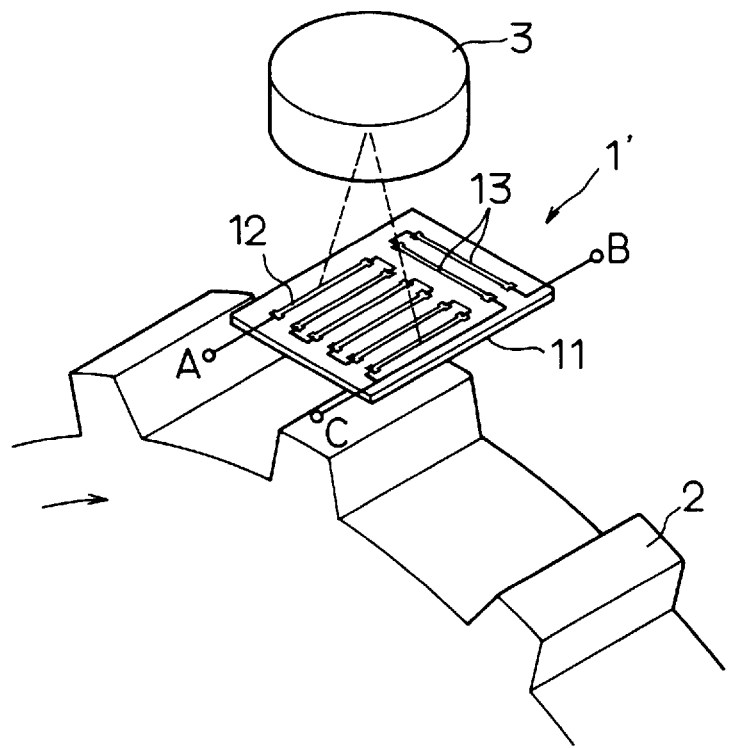
FIG. 12 is a perspective view illustrating a modification to the rotation sensor of the first embodiment.

In short, the construction of the first embodiment can be realized by the state illustrated in FIG. 12, for example. FIG. 12 shows a perspective view of a modification to the rotation sensor of the first embodiment as the third embodiment.

Here, in the rotation sensor illustrated in FIG. 12, a sensor part 1' composes magneto-resistive elements 13 arranged at right angles to the six magneto-resistive elements 12 mounted on the insulating substrate 11, i.e., at right angles to the array of the teeth of the gear 2. The magneto-resistive elements 13 are also electrically connected in series to the magneto-resistive elements 12. These magneto-resistive elements 12 and magneto-resistive elements 13 compose a half-bridge circuit on the insulating substrate 11. The equivalent circuit thereof is illustrated in FIG. 13.

Figure 13:
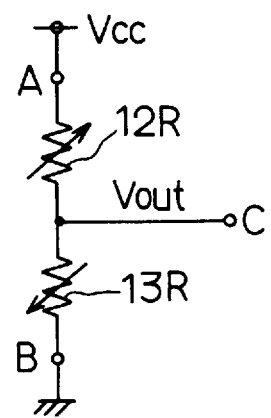
FIG. 13 is a circuit diagram illustrating the equivalent circuit of the sensor part of the modification shown in FIG. 12.

As illustrated in FIG. 13, in the sensor part 1', the terminal A, which is an open end of the magneto-resistive elements 12, is applied with the proper power voltage Vcc, and the terminal B, which is an open end of the magneto-resistive elements 13, are grounded. From the connection point of the magneto-resistive elements 12 and magneto-resistive elements 13 is led out the terminal C, which is an output terminal. From the terminal C is outputted the divided voltage value of the power voltage Vcc due to the resistance values 12R and 13R of the respective magneto-resistive elements 12 and 13 as the output Vout of the rotation sensor.

Here, the resistance value 13R of the magneto-resistive elements 13 arranged at right angles to the array of the teeth of the gear 2 is maintained at an almost constant level, and only the resistance value 12R of the magneto-resistive elements 12 arranged in parallel with the array of the teeth of the gear 2 varies according to the rotation of the gear 2 in the state corresponding to FIG. 5B.

In the rotation sensor composing a half-bridge circuit, as described above, the resistance value 13R of the magneto-resistive elements 13 are maintained at an almost constant level irrespective of the rotation of the gear 2. Therefore, basically, instead of the magneto-resistive elements 13, a fixed resistor may be used.

However, considering the temperature compensation that the rotation sensor should have, the construction illustrated in FIG. 12 is preferable. That is, according to the construction illustrated in FIG. 12, each resistance element composing the half-bridge circuit has equal temperature characteristics, and therefore, even if the ambient temperature varies, the precision of the output from the bridge circuit can preferably be maintained.

Furthermore, according to the first or second embodiment, the six magneto-resistive elements 12a through 12f or the four magneto-resistive elements 62a through 62d are arranged with the same interval. However, the state of arrangement of the magneto-resistive elements, and the number of the magneto-resistive elements, etc. are liberalized.

That is, the magneto-resistive elements connected in series one after another may be arranged with any interval and for any number that enable the magneto-resistive elements to absorb the erroneous output caused to the respective variation waveforms of the resistance values.

In light of the fact that the variations of the resistance values when the gear, an object of detection, is in rotation subtly change according to the positions of the individual magneto-resistive elements, it is possible to optimize the output waveform by purposely changing the arrangement interval of the magneto-resistive elements according to the shape or crest occupied ratio of the gear or adjusting the number of the magneto-resistive elements to be arranged.

In the description of both the first and second embodiments, with respect to a case where the gear 2 or 7, which is the object of detection, has teeth of square or equivalent shape, i.e., the crest length can be deemed equal to the tooth thickness, the width of the arrangement of the magneto-resistive elements suitable to the crest length has been discussed. However, this construction of the rotation sensor may also be applied in the same way to a case where the gear, which is the object of detection, has teeth of triangular or equivalent shape.

In the gear having teeth of triangular or equivalent shape, it has been confirmed that by arranging the plurality of magneto-resistive elements connected in series one after another over a width corresponding to the length that is 25–75% of the tooth pitch of the gear, an output waveform with no erroneous output and with a sufficiently high sensitivity could be obtained.

However, whatever the type of the gear is, if the crest occupied ratio is large, the magnetic vector is difficult to vary. For this reason, the gear with a crest occupied ratio of 25–50% or so is used in most cases.

Accordingly, even when converting to the tooth pitch, in practical application, it is sufficient to parallelly arrange the plurality of magneto-resistive elements within an area corresponding to the length that is 25–75% of the tooth pitch.

Furthermore, in such a structure of the rotation sensor according to the present invention where the magnetic vector of the bias magnetic field varying according to the rotation of the gear is detected based on the composite value of the variations of the resistance values of the respective magneto-resistive elements connected in series one after another, even if the erroneous output is caused in the output, the amplitude of the waveform component corresponding to the erroneous output is minimal compared with the absolute signal amplitude in the output signal.

That is, as the binary waveform reshaping processing based on a specified threshold is executed with respect to the output signal, the existence of such an erroneous output itself is negligible.

As described above, according to the present invention, the parts where the erroneous output are caused in the variation waveforms of the resistance values of the respective magneto-resistive elements are mutually compensated for, and by using these variation waveforms as waveforms that correspond to the respective teeth of the gear, have no erroneous output, and can neglect the erroneous output, if any, the variation of the magnetic vector according to the rotation of the gear can be detected.

Also, according to the present invention, as the respective magneto-resistive elements are "parallelly arranged," a highly sensitive detection of the rotation of the gear (the detection of the magnetic vector according to the rotation of the gear) can be achieved by using large variations of the resistance values.

Furthermore, according to the present invention, the respective magneto-resistive elements are arranged in shifted position one after another in the rotational direction of the gear, there is a little effect of installation error, etc., and the positional restrictions thereof can substantially be eased.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A magnetic gear rotation sensor for detecting a rotation of a magnetic gear having teeth on a periphery thereof, comprising:

a bias magnet which applies a bias magnetic field to the magnetic gear, the bias magnetic field varying in response to the rotation of the magnetic gear;

a plurality of magneto-resistive elements disposed in parallel to each other along a moving direction of the teeth of the magnetic gear between the magnetic gear and the bias magnet and connected electrically in series, wherein the plurality of the magneto-resistive elements are disposed within a range shorter than one tooth pitch of the magnetic gear, and every space between two adjacent magneto-resistive elements has the same interval; and an output terminal connected to one end of the magneto-resistive elements for outputting an electric signal corresponding to a composite value of all variations of resistance of the respective magneto-resistive elements and having one peak in every cycle corresponding to the tooth pitch of the magnetic gear.

2. The magnetic gear rotation sensor of claim 1, wherein:
a number and an interval of the magneto-resistive elements are set to absorb erroneous outputs of the respective magneto-resistive elements.

3. The magnetic gear rotation sensor of claim 2, wherein:
the magneto-resistive elements are arranged in a rotational direction of the magnetic gear along a length that is 0.5 to 1.5 times as long as a crest length of each tooth of the magnetic gear.

4. The magnetic gear rotation sensor of claim 2, wherein:
the magneto-resistive elements are arranged along a length that is 25% to 75% of the tooth pitch of the magnetic gear.

5. The magnetic gear rotation sensor of claim 1, further including:
constant current source which drives the magneto-resistive elements.

6. The magnetic gear rotation sensor of claim 1, wherein:
an electric potential of the output terminal corresponding to the composite value of all variations of resistance of the respective magneto-resistive elements is detected to detect the rotation of the magnetic gear.

7. The magnetic gear rotation sensor of claim 1, wherein:
the magneto-resistive elements are connected to a resistor in series to form a half-bridge circuit; and
one end of the half-bridge circuit receives a specific voltage while another end of the half-bridge circuit is grounded.

8. The magnetic gear rotation sensor of claim 7, wherein:
the resistor is arranged at right angles with respect to the magneto-resistive elements on the same plane as the magneto-resistive elements.

9. The magnetic gear rotation sensor of claim 1, wherein:
a gap-between the tooth of the magnetic gear and the magneto-resistive elements is grater than 0.5 mm.

10. The magnetic gear rotation sensor of claim 9, wherein:
the gap between the tooth of the magnetic gear and the magneto-resistive elements is between 0.5 mm to 1 mm.

11. The magnetic gear rotation sensor of claim 1, wherein:
at least three of the plurality of magneto-resistive elements are electrically connected in series.

12. The magnetic gear rotation sensor of claim 7, wherein:
all the plurality of magneto-resistive elements cooperatively form one bridge leg of the half-bridge circuit.

13. The magnetic gear rotation sensor of claim 1, further comprising:
a constant current power source connected across opposite ends of the series-connected magneto-resistive elements; and
wherein the electric signal output from the magneto-resistive elements is a voltage across both ends of all the series-connected magneto-resistive elements.

14. A magnetic gear rotation sensor for detecting a rotation of a magnetic gear having teeth on a periphery thereof, comprising:
a bias magnet which applies a bias magnetic field to the magnetic gear, the bias magnetic field warming in response to the rotation of the magnetic gear;
a resistor disposed between the magnetic gear and the bias magnet;
a plurality of magneto-resistive elements disposed in parallel to each other along a moving direction of the teeth of the magnetic gear within a range shorter than one tooth pitch of the magnetic gear between the magnetic gear and the bias magnet, and electronically connected in series with the resistor to form a half-bridge circuit having two bridge legs, one of which includes all the plurality of magneto-resistive elements; and
an output terminal connected to one end of the magneto-resistive elements for outputting an electric signal corresponding to a composite value of all variations of resistance of the respective magneto-resistive elements and having one peak in every cycle corresponding to the tooth pitch of the magnetic gear;
wherein a number and an interval of the magneto-resistive elements are set to absorb erroneous outputs of the respective magneto-resistive elements.

15. The magnetic gear rotation sensor of claim 14, wherein:
every space between two adjacent magneto-resistive elements has the same interval.

16. The magnetic gear rotation sensor of claim 14, wherein:
the magneto-resistive elements are arranged in a rotational direction of the magnetic gear along a length that is 0.5 to 1.5 times as long as a crest length of each tooth of the magnetic gear.

17. The magnetic gear rotation sensor of claim 14, wherein:
the magneto-resistive elements are arranged along a length that is 25% to 75% of the tooth pitch of the magnetic gear.

18. The magnetic gear rotation sensor of claim 14, wherein:
a gap-between the tooth of the magnetic gear and the magneto-resistive elements is greater than 0.5 mm.

19. A magnetic gear rotation sensor for detecting a rotation of a magnetic gear having teeth on a periphery thereof, comprising:
a bias magnet which applies a bias magnetic field to the magnetic gear, the bias magnetic field varying in response to the rotation of the magnetic gear;
a resistor disposed between the magnetic gear and the bias magnet;
a plurality of magneto-resistive elements disposed in parallel to each other along a moving direction of the teeth of the magnetic gear within a range shorter than one tooth pitch of the magnetic gear between the magnetic gear and the bias magnet, and electrically connected in series with the resistor to form a half-bridge circuit having two bridge legs, one of which includes all the plurality of magneto-resistive elements; and
an output terminal connected to one end of the magneto-resistive elements for outputting an electric signal corresponding to a composite value of all variations of resistance of the respective magneto-resistive elements and having one peak in every cycle corresponding to the tooth pitch of the magnetic gear,
wherein the resistor is arranged at right angles with respect to the magneto-resistive elements on the same plane as the magneto-resistive elements.

20. The magnetic gear rotation sensor of claim 19, wherein: the resistor includes a magneto-resistive element.

21. The magnetic gear rotation sensor of claim 20, wherein:
the magneto-resistive element of the resistor has a constant value of resistance.

22. A magnetic gear rotation sensor for detecting a rotation of a magnetic gear having teeth on a periphery thereof, comprising:

a bias magnet which applies a bias magnetic field to the magnetic gear, the bias magnetic field warming in response to the rotation of the magnetic gear:

a resistor disposed between the magnetic gear and the bias magnet;

a plurality of magneto-resistive elements disposed in parallel to each other along a moving direction of the teeth of the magnetic gear within a range shorter than one tooth pitch of the magnetic gear between the magnetic gear and the bias magnet, and electrically connected in series with the resistor to form a half-bridge circuit having two bridge legs, one of which includes all the plurality of magneto-resistive elements; and an output terminal connected to one end of the magneto-resistive elements for outputting an electric signal corresponding to a composite value of all variations of resistance of the respective magneto-resistive elements and having one peak in every cycle corresponding to the tooth pitch of the magnetic gear, wherein the resistor includes a magneto-resistive element having a constant value of resistance.

23. A magnetic gear rotation sensor for detecting a rotation of a magnetic gear having teeth on a periphery thereof, comprising:

a bias magnet which applies a bias magnetic field to the magnetic field to the magnetic gear, the bias magnetic field varying in response to the rotation of the magnetic gear:

a resistor disposed between the magnetic gear and the bias magnet;

a plurality of magneto-resistive elements disposed in parallel to each other along a moving direction of the teeth of the magnetic gear within a range shorter than one tooth pitch of the magnetic gear between the magnetic gear and the bias magnet, and electrically connected in series with the resistor to form a half-bridge circuit having two bridge legs, one of which includes all the plurality of magneto-resistive elements, an output terminal connected to one end of the magneto-resistive elements for outputting an electric signal corresponding to a composite value of all variations of resistance of the respective magneto-resistive elements and having one peak in every cycle corresponding to the tooth pitch of the magnetic gear; and a constant current power source connected to the end of all the magneto-resistive elements, wherein the electric signal output from the magneto-resistive elements is a voltage across both ends of all the series-connected magneto-resistive elements.

24. A magnetic gear rotation sensor for detecting a rotation of a magnetic gear having teeth on a periphery thereof, comprising:

a bias magnet which applies a bias magnetic field to the magnetic gear, the bias magnetic field varying in response to the rotation of the magnetic gear;

a plurality of magneto-resistive elements disposed in parallel to each other along a moving direction of the teeth of the magnetic gear within a range shorter than one tooth pitch of the magnetic gear between the magnetic gear and the bias magnet, and electrically connected in series; and output terminals connected to the series-connected magneto-resistive elements at points at which operative power is applied to said series-connected magneto-resistive elements, for outputting an electric signal corresponding to a composite value of all variations of resistance of the respective magneto-resistive elements and having one peak in every cycle corresponding to the tooth pitch of the magnetic gear.

25. The magnetic gear rotation sensor of claim 24, further comprising:

a constant current power source connected to an end of all the magneto-resistive elements; and wherein the electric signal output from the magneto-resistive elements is a voltage across both ends of all the series-connected magneto-resistive elements.

26. The magnetic gear rotation sensor of claim 24, wherein:

a number and an interval of the magneto-resistive elements are set to absorb erroneous outputs of the respective magneto-resistive elements.

27. The magnetic gear rotation sensor of claim 24, wherein:

every space between two adjacent magneto-resistive elements has the same interval.

28. The magnetic gear rotation sensor of claim 24, wherein:

the magneto-resistive elements are arranged in a rotational direction of the magnetic gear along a, length that is 0.5 to 1.5 times as long as a crest length of each tooth of the magnetic gear.

29. The magnetic gear rotation sensor of claim 24, wherein:

the magneto-resistive elements are arranged along a length that is 25% to 75% of the tooth pitch of the magnetic gear.

30. The magnetic gear rotation sensor of claim 24, wherein:

a gap between the tooth of the magnetic gear and the magneto-resistive elements is greater than 0.5 mm.

31. The magnetic gear rotation sensor of claim 24, further comprising:

a resistor electrically connected to the magneto-resistive elements to form a half bridge circuit; and wherein all the magneto-resistive elements cooperatively form one leg of the half bridge circuit.

32. The magnetic gear rotation sensor of claim 31, wherein:

the resistor is arranged at right angles with respect to the magneto-resistive elements on the same plane as the magneto-resistive elements.

33. The magnetic gear rotation sensor according to claim 31, wherein:

the resistor has a constant value of resistance.

34. The magnetic gear rotation sensor of claim 33, wherein:

the resistor includes a magneto-resistive element.

* * * * *